United States Patent Office 2,890,167
Patented June 9, 1959

2,890,167

CONVERSION PROCESS USING A PHOSPHORUS-CONTAINING PLATINUM GROUP METAL CATALYST

Vladimir Haensel, Hinsdale, Ill., assignor, by mesne assignments, to Universal Oil Products Company, Des Plaines, Ill., a corporation of Delaware No Drawing. Application November 16, 1953
Serial No. 392,490

6 Claims. (Cl. 208—139)

This application is a continuation-in-part of my copending application Serial No. 238,772, filed July 26, 1951, and now abandoned, which in turn is a continuation-in-part of application Serial No. 93,423, filed May 14, 1949, now abandoned, and relates to a reforming process and more particularly to the reforming of gasoline or fractions thereof in the presence of particular catalysts.

An object of this invention is to produce a catalyst having a high activity for effecting hydrocarbon conversion reactions. Another object of this invention is to produce a catalyst useful in the reforming of hydrocarbon fractions, such as gasoline, to produce a reformed product of improved antiknock characteristics.

In one embodiment the present invention relates to a conversion process which comprises subjecting an organic compound to conversion in the presence of a catalyst comprising a cracking component, a compound of phosphorus, and a component selected from the group consisting of the metals and compounds of the metals in group VIII of the periodic table and mixtures thereof.

In another embodiment the present invention relates to a conversion process which comprises subjecting a hydrocarbon to contact at conversion conditions with a catalyst comprising a cracking component, from about 0.05% to about 25% by weight of a phosphorus compound (calculated as the element), and from about 0.01% to about 10% by weight of a component (calculated as the metal) selected from the group consisting of the metals and compounds of the metals of the platinum group and mixtures thereof.

In a specific embodiment the present invention relates to a process for reforming gasoline which comprises subjecting said gasoline to contact at reforming conditions with a catalyst comprising alumina, from about 0.1% to about 10% by weight of halogen, from about 0.05% to about 25% by weight of a phosphorus compound (calculated as the element), and from about 0.01% to about 1% by weight of a component (calculated as the metal) selected from the group consisting of the metals platinum and palladium, compounds of platinum, compounds of palladium, and mixtures thereof.

In a further embodiment the present invention relates to a catalyst comprising a cracking component, a compound of phosphorus and a component selected from the group consisting of the metals and compounds of the metals in group VIII of the periodic table and mixtures thereof.

In a still further embodiment the present invention relates to a method of preparing a catalyst which comprises compositing a cracking component with a compound of phosphorus and with a compound of a metal selected from the platinum group and mixtures thereof, and calcining the resultant composite.

While the catalyst of the present invention is particularly suitable for the reforming of gasoline, it is understood that this novel catalyst may be utilized for the conversion of other hydrocarbon fractions. Thus the catalyst may be used for the dehydrogenation of selected hydrocarbon fractions, such as naphthenes to produce aromatics, including specifically the dehydrogenation of cyclohexane to benzene, etc.; the dehydrogenation of paraffins to produce the corresponding olefins, including specifically the dehydrogenation of butane to butene, pentane to pentene, hexane to hexene, etc.; the dehydrogenation of mono-olefins to produce the corresponding diolefins, including specifically the dehydrogenation of butene to butadiene, pentene to pentadiene, etc. The catalyst may also be utilized to effect dehydrocyclization reactions, including specifically the conversion of normal hexane to benzene, normal heptane to toluene, etc. This reaction is very important in the reforming process since the normal straight chain paraffins have low octane ratings and their conversion to aromatics by the dehydrocyclization reaction greatly increases the octane number of the final reformed gasoline. Because of the activity of the catalyst for dehydrocyclization reactions, it is utilized for the production of aromatics from aliphatic hydrocarbons of from 6 to 12 carbon atoms per molecule. The catalyst may also be used for effecting isomerization reactions including the isomerization of normal or mildly branched chain paraffins, the isomerization of alkylcyclic compounds to isomers thereof, including the isomerization of methylcyclopentane to cyclohexane, ethylcyclopentane to methylcyclohexane, etc., the isomerization of alkylbenzenes, etc. Furthermore, the catalyst may also be used for effecting hydrogenation reactions including nondestructive hydrogenation as, for example, the hydrogenation of butene to butane, pentene to pentane, aromatics to cycloparaffins, etc. and for the destructive hydrogenation of heavier oil to gases and/or gasoline fractions.

In still another embodiment the catalyst of the present invention may be used for effecting oxidation of hydrocarbons to form the corresponding oxides, such as the oxidation of ethylene to ethylene oxide and the conversion of paraffins to alcohols. The catalysts are also very effective for desulfurizing sulfur-containing fractions. The desulfurization may be effected in the presence or absence of hydrogen. In the desulfurization reaction, the organic sulfur compounds, such as mercaptans or thiophenes, are converted to hydrogen sulfide which may be stripped out in subsequent operations.

The catalyst, however, is particularly suitable for use in a reforming process. The petroleum fraction that is upgraded in reforming may be a full boiling range straight run gasoline having an initial boiling point within the range of from about 50° F. to about 100° F. and an end boiling point within the range of from about 350° F. to about 425° F., or any selected fraction thereof. It may also be a natural gasoline as obtained from the refining of natural gases, or it may be any selected fraction of the natural gasoline. The natural gasoline or the natural gasoline fraction will have an initial boiling point and an end boiling point, substantially the same as that of the straight run gasoline hereinbefore described. The catalyst of the present invention may also be applied to the reforming of cracked gasoline or mixtures of cracked and straight run and/or natural gasoline. Reference to gasoline in the present specification, therefore, means a full boiling range gasoline or any fraction thereof and also that the gasoline fraction may contain components boiling above the gasoline range.

In the reforming process there are four major reactions. The first is a dehydrogenation or aromatization reaction in which the naphthene hydrocarbons are converted to aromatics. The second is a dehydrocyclization reaction in which the straight chain or slightly branched chain paraffins are cyclized to form aromatics. This second reaction is highly important in a reforming process since the octane number of straight chain or slightly branched chain paraffins is substantially lower than the octane number of the corresponding aromatic that is formed by the dehydrocyclization reaction. The third major reaction is an isomerization reaction in which the straight chain or slightly branched chain paraffins are converted to more branched chain paraffins. This reaction occurs as a result of a strain put upon the carbon to carbon bond so that there is a shift of a carbon atom in the molecule to form a more branched chain molecule. In this specific reaction, there is no change of molecular weight. The reaction may also be characterized as increasing the number of methyl groups in the hydrocarbon molecule. The fourth is a selective hydrocracking reaction in which the heavier straight chain or slightly branched chain paraffins, which have low antiknock characteristics, are converted, in the presence of hydrogen, to lighter straight chain or branched chain paraffins which have higher antiknock characteristics. The cracking or splitting of the carbon to carbon bond is one of the more important reactions in a successful reforming process. It is necessary that the splitting of the carbon to carbon bond be controlled so that there is no excessivve formation of normally gaseous products. For example, it would be possible to crack a $C_{10}$ hydrocarbon so that 10 molecules of methane are formed. However, unless methane is the specifically desired product, it would be uneconomical in a reforming process to crack the $C_{10}$ hydrocarbon to form methane. It is more desirable to crack a $C_{10}$ hydrocarbon so that 2 molecules of pentane are formed, and it would be still more desirable if, during the reaction, isomerization would simultaneously take place, so that the product obtained is isopentane. One object of the present invention is to provide a catalyst wherein the cracking activity is controlled and selective so that excessive amounts of normally gaseous products are not produced in a reforming process.

The catalyst is also highly suitable for the production of aromatics because of the dehydrocyclicizing properties of the catalyst. The hydrocarbon that is aromatized with the catalyst of the preesnt invention usually is a petroleum fraction containing aliphatic hydrocarbons of from 6 to 12 carbon atoms per molecule. The process is also very suitable for the production of pure aromatics from a specific compound. For example, benzene may be prepared from normal hexane and toluene from normal heptane in high yields.

The processing temperatures will depend upon the particular catalyst being used but will ordinarily be within the range of from about 750° F. to about 1100° F. In general, pressures of from about 50 to about 1000 pounds per square inch are satisfactory. The process is usually conducted at a weight hourly space velocity of from about 0.5 to about 20 or more and in the presence of hydrogen at a mole ratio of from about 0.5 to about 20 or more moles of hydrogen per mole of hydrocarbon.

In accordance with the present invention, the novel catalyst comprises a mixture, each component exerting a peculiar influence on the other components. For example, in a reforming process as hereinbefore set forth, the desired principal reactions comprise dehydrogenation, isomerization, dehydrocyclization and controlled cracking, and these reactions must be carefully balanced for successful operation. While various catalyst composites, including those of alumina-chromina, alumina-molybdena, etc., have been utilized heretofore in reforming operations, these catalysts are not entirely satisfactory in that they may be deficient in dehydrogenation, isomerization, dehydrocyclization, and/or selective cracking properties. These disadvantages are overcome by the novel catalyst of the present invention which, due to the peculiar influence of one component on the other, as hereinbefore set forth, results in a catalyst which more properly effects the desired balance of these reactions. For example, the halogen in combination with the other components appears to modify the other components of the catalyst in effecting the desired isomerization and selective cracking reactions along with dehydrogenation. As another example, the phosphorus or a compound of phosphorus appears to modify the other components of the catalyst in effecting the dehydrocyclization reaction.

A further advantage to the novel catalyst of the present invention is that these reactions may be effected at a low temperature and this offers a better control of the cracking reaction. For example, with the prior catalysts it has been necessary to utilize higher temperatures in order to obtain cracking reactions and, when the higher temperatures were used, the cracking reactions occurred in excess. This in turn resulted in a loss of charging stock to undesirable gaseous products, as well as in an increase in carbon deposits on the catalyst which, in turn, resulted in more rapid deactivation of the catalyst and consequently more frequent regeneration or replacement.

A primary component of the novel catalyst of the present invention comprises a cracking component. The cracking activity varies wtih the particular components selected. The activity is carefully controlled and can promote only a slight degree of cracking, however, the component may contain high cracking activity when desired. Besides the cracking activity this component may promote other reactions such as isomerization, hydrogen transfer, aromatization, etc. One cracking component comprises at least two refractory inorganic oxides. Another cracking component comprises a refractory inorganic oxide and halogen. Suitable but not necessarily equivalent refractory inorganic oxides comprise the oxides of aluminum, silicon, zirconium, zinc, titanium, magnesium, cadmium, gallium, iridium, thallium, germanium, tin, cerium, lead, thorium, vanadium, columbium, tantalum, chromium, molybdenum, tungsten, uranium, manganese, etc. Preferred combinations for the cracking component which comprises at least two refractory oxides are, alumina-silica, alumina-titania, alumina-boron oxide, silica-magnesia, silica-zirconia, silica-thoria, etc. The preferred oxides for the cracking component which comprises a refractory oxide and halogen are the oxides of aluminum, zirconium, zinc, titanium, magnesium and cadmium, however, not necessarily with equivalent results. Combinations of two or more of these oxides for example alumina-silica, silica-zirconia, etc., may be used for compositing with the halogen within the scope of this invention but again not necessarily with equivalent results. Likewise three or more of these oxides may be composited for the cracking component or inorganic oxide to be composited with halogen such as alumina-silica-zironia, alumina-thoria-boria, alumina-zirconia-magnesia, etc. The cracking components also include various naturally occurring aluminum silicates, particularly when acid treated to increase the activity, such as Super Filtrol, etc.

The halogen includes fluorine, chlorine, iodine, and bromine. The preferred halogen comprises fluorine and chlorine. In general, fluorine, appears to be less easily removed from the catalyst composite and of higher activity and therefore is preferred in many cases. It is understood that the halogen may comprise a mixture of two or more of the halogens, a preferred mixture comprising fluorine and chlorine.

The next component in the catalyst comprises a compound of phosphorus. The exact form that the phosphorus is present in the catalyst is not known. When one of the components of the cracking component is alumina, the phosphorus may be present as an aluminum phosphate. When the cracking component comprises alumina and silica, it appears that the phosphorus enters into some sort of a physical association or chemical combination with the silica as well as the alumina. Regardless of the manner in which the phosphorus is associated with the other components of the catalyst, it has been found that the presence of phosphorus has highly beneficial effects and I do not intend my invention to be limited to the explanations hereinbefore set forth.

Another component to be composited in the catalyst comprises a metal or a compound of a metal selected from group VIII of the periodic table. While platinum is a preferred component it is understood that other suitable members of group VIII and particularly of the platinum group may be employed. These other components may include, although not necessarily with equivalent results, the metals or compounds of nickel, cobalt, palladium, iridium, etc., or mixtures of two or more thereof.

It is understood that the various combinations of components which may be prepared and used in accordance with the present invention are not necessarily equivalent.

In general, the refractory oxide will comprise a major proportion of the catalyst and thus will range from about 50 to about 99.8% by weight of the catalyst composite. The halogen will generally be used in amounts of from about 0.1% to about 10% by weight of the final catalyst. When fluorine is the halogen, it will be used in amounts of from about 0.1% to about 3% by weight of the catalyst, and when chlorine is the halogen, it will generally be used in amounts of from about 0.1% to about 8% by weight of the catalyst. As hereinbefore set forth, the halogen may comprise a mixture of two or more halogens, and the total amount of halogen will generally be within the ranges herein set forth.

The compound of phosphorus will generally be utilized in amounts of from about 0.05% to about 25% by weight (calculated as the element) of the final catalyst and preferably from about 0.1% to about 5% by weight. The concentration of the metal selected or compound of the metal selected from group VIII of the periodic table will generally be from about 0.01% to about 10% by weight (calculated as the metal) of the final catalyst. It is understood that when desired two or more metals or compounds of metals of this group may be utilized in the catalyst composite.

The catalyst composite of the present invention may be made in any suitable manner including separate, successive or coprecipitation methods. The refractory oxide may be prepared in any suitable manner. For example, alumina may be prepared by adding a reagent such as ammonium hydroxide, ammonium carbonate, etc. to a salt of aluminum, such as aluminum chloride, aluminum nitrate, aluminum acetate, etc., in an amount to form aluminum hydroxide, which upon drying is converted to alumina. In the present specification and claims the aluminum hydroxide is referred to as alumina in order that the percentages are based on the alumina free of combined water. It has been found that a chloride of aluminum is generally preferred as the aluminum salt to be used, not only for convenience in subsequent washing and filtering procedures but also because it appears to give best results. After the alumina has been formed, it is generally washed to remove soluble impurities. Usual washing procedures comprise washing with water either in combination with filtering or as separate steps. It has been found that filtration of the alumina is improved when the wash water contains a small amount of ammonium hydroxide. The ordinary washing may generally depend upon whether all or part of the chlorine is to be retained in the catalyst composite. When chlorine is not desired, the alumina is washed thoroughly to remove substantially all of the chlorine. On the other hand, if part of the chlorine is to be retained in the catalyst, the washing is less severe. In general, it is preferred to wash the alumina thoroughly and, if chlorine is desired, it is added as a separate step, because better control of the amount of chlorine is obtained in this manner. Alumina spheres may be continuously prepared by passing droplets of an alumina sol into an oil bath maintained at an elevated temperature and retaining the droplets in the oil bath until the droplets set to gel spheres. The spheres are continuously withdrawn from the oil bath and immediately thereafter aged prior to being contacted with water or aqueous solution.

Silica may be prepared in any suitable manner, one method being to commingle water glass and a mineral acid under conditions to precipitate a silica hydrogel. The silica hydrogel is washed with water containing a small amount of electrolyte to remove sodium ions. Oxides of other compounds may be prepared by reacting a basic reagent such as ammonium hydroxide, ammonium carbonate, etc., with an acid salt solution of the metal; as for example, the chloride, sulface, nitrate, etc., or by adding an acid to an alkali salt of the metal as, for example, commingling sulfuric acid with sodium aluminate, etc. Usually the metal oxide will be washed and filtered which may be done in the same or separate steps and may be effected in the presence of an acid or a base as desired. When it is desired top repare the catalyst in the form of pills of uniform size and shape, this may readily be accomplished by grinding the partially dried oxide cake with a suitable lubricant such as stearic acid, rosin, graphite, etc., and then forming the pills in any suitable pelleting or extrusion apparatus.

When the cracking component comprises at least two refractory inorganic oxides, the composite may be prepared in any suitable manner including separate successive or coprecipitation methods. In the separate precipitation method the oxides are precipitated separately and then mixed, preferably in the wet state. When successive precipitation methods are employed, the first refractory inorganic oxide is precipitated, as hereinbefore set forth, and the wet slurry, either with or without prior washing, may be composited with a salt of the other component and precipitation of the oxide is effected by the addition of a suitable base or acid as required. This composite may then be dried and formed into particles.

Preferred cracking components comprise silica-alumina and silica-alumina-zirconia which are preferably manufactured by commingly an acid, such as hydrochloric acid, sulfuric acid, etc., with commercial water glass under conditions to precipitate silica, washing with acidulated water or otherwise to remove sodium ions, commingling with an aluminum salt such as aluminum chloride, aluminum sulfate, aluminum nitrate, and/or zirconium salt, etc., and either adding a basic precipitant, such as ammonium hydioxide, to precipitate alumina and/or zirconia, or forming the desired oxide or oxides by thermal decomposition of the salt as the case may permit. The silica-alumina-zirconia cracking component may be formed by adding the aluminum and/or zirconium salts together or separately. The other cracking components may be prepared in a similar manner, however, not necessarily with equivalent results.

The phosphorus component or compound of phosphorus may be composited with the other components in any suitable manner including separate, successive or co-precipitation methods. A convenient method is to impregnate the cracking component with a suitable solution such as a solution of phosphoric acid. This component may also be composited when the cracking component is being prepared. The concentration of the phosphorus impregnating solution will depend upon the final concentration of the phosphorus that is desired in the catalyst, the solubility of the particular compound, etc. The concentration of the phosphorus component, however, will lie within the ranges hereinbefore specified and further the concentration is calculated as the weight percent of the element phosphorus, even though phosphorus is not present as the free element but as a compound thereof. After the compositing of this phosphorus component, the mixture may be dried and composited with the other components or may be formed into particles of uniform size and shape when the other components were not thus formed prior to this step.

The phosphorus component is usually added to the composite as an aqueous solution of phosphoric acid or other water soluble salt. Other acids of phosphorus may be used as well as compounds of phosphorus that may be put into solution. It is preferred that the phosphorus compound be water soluble, however, other solutions such as alcohol solutions, ether solutions, glycol solution, etc., may also be suitable.

The halogen may be added to the catalyst in any suitable manner and either before or after precipitation of the oxide. While the halogen may be utilized as such, it generally is preferred to utilize the halogen as an aqueous solution of the hydrogen halide for ease in handling. In the preferred method, the halogen is added to the refractory oxide before the other components are composited therewith. When alumina is the selected refractory oxide, the halogen is preferably incorporated into the alumina before forming into particles and this may be accomplished by the use of an acid such as hydrogen fluoride, hydrogen chloride, hydrogen bromide, and/or hydrogen iodide. In some cases, volatile salts, such as ammonium fluoride, ammonium chloride, etc., may be employed. In any event, the amount of halogen will be in the range of from about 0.1% to about 10% by weight of the final catalyst. Chemically combined fluorine appears to be more active and therefore will be used within the range of from about 0.1% to about 3% by weight of the refractory oxide on a dry basis. The chloride content will be used within the range of from about 0.1% to about 8% and preferably from about 0.2% to about 5% by weight of the final catalyst on a dry basis.

In a preferred embodiment of the invention, platinum is composited with the catalyst generally in an amount of from about 0.01% to about 1% by weight of the catalyst. Platinum is a particularly desirable metal component to be incorporated into the catalyst, since catalysts containing low concentrations of platinum have been found to be very active, especially when the catalyst is to be used in reforming operations. The metal selected from the platinum group, may be incorporated into the catalyst in any suitable manner. When platinum is the selected active metal component, one method of introduction is to form a separate solution of chloroplatinic acid and water and to introduce hydrogen sulfide into this solution at room temperature until the chloroplatinic acid solution reaches a constant coloration, that is, there will be no change in color upon addition of more hydrogen sulfide. A chloroplatinic acid solution is normally light yellow and upon addition of hydrogen sulfide gas turns to a dark brown color. Apparently the chloroplatinic acid and hydrogen sulfide react to form one or more complexes or chemical compounds. The brown solution of chloroplatinic acid and hydrogen sulfide may then be commingled with the other components of the catalyst as hereinbefore set forth.

Another method of introducing the platinum into the catalyst, is to form a separate aqueous solution of chloroplatinic acid and add ammonium hydroxide to give a solution having a pH between the range of from about 5 to about 10. This solution is then commingled with the other components of the catalyst. Although the platinum is preferably introduced as a solution of chloroplatinic acid, other suitable platinum solutions may be employed, such as solutions, colloidal solutions or suspensions of platinum cyanide, platinum hydroxide, platinum oxide, platinum sulfate, etc. In cases where these solutions are not soluble in water at the temperature used, other suitable solvents such as alcohols, ethers, etc., may be utilized. The platinum appears to enter into a peculiar association with the other components of the catalyst and thereby serves to improve the antiknock characteristics of the products obtained in the process. While platinum is a preferred component, it is understood that other suitable components selected from group VIII may be employed. These components may include, although not necessarily with equivalent results, nickel, cobalt, ruthenium, rhodium, osmium, iridium, and palladium, etc., or mixtures of two or more of these metals.

The concentration of the metal component selected from group VIII will vary according to the particular component selected and the conversion process in which it is to be used, however, the concentration generally will lie within the range of from about 0.01% to about 10% by weight of the final catalyst.

The catalyst composite, before or after all of the components of the catalyst are present therein, is usually subjected to a high temperature treatment. The cracking component may be subjected to a high temperature treatment or calcination before the other components of the catalyst are composited therewith. The heating is conducted at a temperature of from about 500° F. to about 1600° F. or more but usually not in excess of 1400° F.

After the addition of the phosphorus compound, the temperature preferably should not exceed 1400° F. since in some cases temperatures in excess of this will affect the activity of the catalyst. After the addition of a compound of a metal in group VIII of the periodic table, the usual calcination temperature is from about 600° F. to about 1200° F. and preferably not above 1100° F. The heat treatment or calcination may be conducted in an oxidizing atmosphere; a reducing atmosphere, such as hydrogen methane, etc.; or an inert atmosphere such as nitrogen, etc. In some cases the calcination may take place in air followed by heat treating in the presence of hydrogen or the reverse procedure may be used. The preferred heating periods are from about one to about eight hours or more.

Although the catalyst of the present invention will have a long life, it may be necessary to regenerate the catalyst after long periods of service. The regeneration may be effected by treatment with air or other oxygen-containing gas to burn the carbonaceous matter therefrom. In general, it is preferred to control the regeneration temperature not to exceed about 1200° F.

As hereinbefore set forth, these catalysts are particularly suitable for use in the reforming of gasoline or fractions thereof. The exact operating conditions depend upon the character of the charging stock as well as the activity of the catalyst being used, however, the conditions usually will be in the following ranges: Temperatures from about 500° F. to about 1100° F., a pressure of from about 50 to about 1000 p.s.i. or more, weight hourly space velocity (defined as the weight of oil per hour per weight of catalyst in the reaction zone) of from about 0.5 to about 20 or more. The reforming is preferably effected in the presence of hydrogen which may be introduced from an extraneous source of recycled from within the process. In the preferred mode of operation, sufficient hydrogen is produced and recycled so that no extraneous source of hydrogen is necessary. A hydrogen to hydrocarbon mole ratio of from about 0.5 to about 20 or more moles of hydrogen per mole of hydrocarbon is usual.

Processes using the catalyst of the present invention may be effected in any suitable equipment. The catalyst may be deposited as a fixed bed in a reactor and the hydrocarbon to be treated is passed therethrough in either upward or downward flow. The catalyst may be used in a fluidized type of operation in which the catalyst and hydrocarbons are maintained in a state of turbulence under hindered settling conditions, or a fluidized fixed bed type of operation may be used in which the catalyst and hydrocarbons are maintained in a state of turbulence under hindered settling conditions, but where catalyst is not withdrawn from or introduced into the reaction zone during the processing cycle. The catalyst may also be used in the moving bed type of process, in which the catalyst and hydrocarbons are passed either in concurrent or countercurrent flow through a reaction zone, and the catalyst may also be used in the suspensoid type of operation in which the catalyst and hydrocarbons are passed as a slurry through the reaction zone. The reactants from any of the hereinbeforementioned reaction zones are normally subjected to a further treatment, such as the stabilization of the product to separate normally gaseous products therefrom and to obtain a final reformed product of the desired volatility and vapor pressure.

The following examples are given to illustrate my invention but are not given for the purpose of unduly limiting the generally broad scope of the present invention.

Example I

A silica-alumina cracking component is prepared by adding hydrochloric acid to commercial water glass in proportions to precipitate silica hydrogel, the silica hydrogel being formed into spheres by discharging the mixture of water glass and acid into an oil bath. The silica spheres are washed with acidulated water to remove sodium ions and the spheres are then submerged in a bath of aluminum chloride, after which ammonium hydroxide is added to precipitate alumina. The silica-alumina composite is then dried and a solution of phosphoric acid is added to the composite in an amount so that the final catalyst contains 2% by weight of a phosphorus component (calculated as phosphorus). This composite is dried and calcined in air at 1000° F. for three hours. The composite is then impregnated with a platinum-containing solution consisting of $H_2PtCl_6 \cdot 6H_2O$ dissolved in water containing 2 ml. ammonium hydroxide per 11 ml. of solution. Enough of this ammoniacal platinum solution is used to give a final catalyst containing 0.5% platinum by weight. After the impregnation, the composite is calcined in air at 932° F. for three hours.

This catalyst may be used in the reforming of a Mid-Continent naphtha having a boiling range from 225° F. to 405° F. The reforming is effected at an average catalyst temperature of 860° F., a pressure of 500 pounds per square inch, a liquid hourly space velocity of 2.0 and a hydrogen to hydrocarbon mole ratio of 7 to 1. The product from this reforming operation shows superior antiknock characteristics.

Example II

To show the beneficial effects of phosphorus two catalysts were prepared. Catalyst A contained alumina, 0.3% platinum, 0.1% fluorine and 0.155% phosphorus. Catalyst B contained alumina, 0.3% platinum and 0.1% fluorine. These catalysts were prepared substantially as follows. Ammonium hydroxide was added to aluminum chloride hexahydrate to precipitate aluminum hydroxide. The aluminum hydroxide was washed with ammoniated water to remove soluble impurities and commingled with an aqueous 4.8% hydrogen fluoride solution in an amount to form a final catalyst containing 0.1% by weight of combined fluorine. The composite was dried at a temperature of 300° F., mixed with Stearotex, formed into pills of uniform size and shape in a pelleting apparatus, and the pills were calcined in air at 1200° F. In preparing Catalyst A 0.17 ml. of an 85% solution of phosphoric acid was diluted with water to 50 ml. and the 50 ml. of solution were then poured over 50 grams of the calcined pills prepared as hereinbefore described. The pills and solutions were allowed to stand ½ hour, dried on a water bath and calcined for three hours in a muffle furnace at 932° F. These calcined pills were then impregnated with a dilute solution of chloroplatinic acid in an amount so that the final catalyst contained 0.3% platinum by weight. After the impregnation, the pills were partially dried and calcined in a stream of air at 932° F. for three hours.

Catalyst B was prepared substantially as above except that phosphorus was not added in the preparation. These catalysts were separately used for the reforming of a Mid-Continent naphtha having a boiling range from 215° F. to 402° F. The reforming was effected at an average catalyst temperature of 978° F., a pressure of 300 pounds per square inch, a liquid hourly space velocity of 12.0 and a hydrogen to hydrocarbon mole ratio of 1.75 to 1. The catalysts were tested sepaartely for 18 hours and the product from the last hour was collected and analyzed. The product from the reforming using Catalyst A contained 49.9% by weight of aromatics, while Catalyst B produced 48.3% by weight of aromatics. These results show that the presence of phosphorus increases the aromatizing activity of the catalyst. The catalysts were also analyzed for carbon content. Catalyst A contained 3.15% by weight of carbon, and Catalyst B contained 3.41% by weight of carbon. These results illustrate that the presence of phosphorus produces a catalyst which has smaller carbon forming tendencies and, therefore, it is to be expected that the phosphorus-containing catalyst will have a longer useful catalyst life.

I claim as my invention:

1. A process which comprises subjecting a hydrocarbon boiling in the gasoline range to contact at reforming conditions with a catalyst comprising a refractory oxide, from about 0.1% to about 5.0% by weight of phosphorus calculated as the element, halogen and from about 0.01% to about 10% by weight of a platinum group metal.

2. A process for reforming a gasoline fraction which comprises subjecting said gasoline fraction to contact at reforming conditions with a catalyst comprising a refractory oxide, halogen, from about 0.1% to about 5.0% by weight of phosphorus calculated as the element, and a platinum group metal.

3. A process for reforming a gasoline fraction which comprises subjecting said gasoline fraction to contact at reforming conditions with a catalyst comprising alumina, halogen in an amount of from about 0.1% to about 10% by weight, from about 0.1% to about 5.0% by weight of phosphorus calculated as the element and from about 0.01% to about 10% by weight of a platinum group metal.

4. A process for reforming a gasoline fraction which comprises subjecting said gasoline fraction to contact at reforming conditions with a catalyst comprising alumina, fluorine in an amount of from about 0.1% to about 3% by weight, from about 0.1% to about 5% by weight of phosphorus calculated as the element and from about 0.01% to about 1% by weight of platinum.

5. A catalyst comprising a major proportion of alumina, from about 0.1% to about 10% by weight of halogen, from about 0.1% to about 5.0% by weight of phosphorus calculated as the element, and from about 0.01% to about 10% by weight of a metal in group VIII of the periodic table.

6. A catalyst comprising a major proportion of alumina, from about 0.1% to about 3% by weight of fluorine, from about 0.1% to about 5% by weight of phosphorus calculated as the element, and from about 0.01% to about 1% by weight of platinum.

References Cited in the file of this patent

UNITED STATES PATENTS

| | | |
|---|---|---|
| 2,428,741 | Plank | Oct. 7, 1947 |
| 2,441,297 | Stirton | May 11, 1948 |
| 2,566,521 | Haensel | Sept. 4, 1951 |
| 2,762,781 | Noyaki | Sept. 11, 1956 |